US010013946B2

(12) United States Patent
Liao et al.

(10) Patent No.: US 10,013,946 B2
(45) Date of Patent: Jul. 3, 2018

(54) PIXEL DRIVING CIRCUIT AND DRIVING METHOD THEREOF, DISPLAY PANEL AND DISPLAY APPARATUS

(71) Applicant: BOE Technology Group Co., Ltd., Beijing (CN)

(72) Inventors: Feng Liao, Beijing (CN); Guangliang Shang, Beijing (CN); Kuanjun Peng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 28 days.

(21) Appl. No.: 15/126,641

(22) PCT Filed: Dec. 31, 2015

(86) PCT No.: PCT/CN2015/100139
§ 371 (c)(1),
(2) Date: Sep. 16, 2016

(87) PCT Pub. No.: WO2017/008456
PCT Pub. Date: Jan. 19, 2017

(65) Prior Publication Data

US 2017/0169789 A1 Jun. 15, 2017

(30) Foreign Application Priority Data

Jul. 13, 2015 (CN) .......................... 2015 1 0409338

(51) Int. Cl.
*G09G 3/30* (2006.01)
*G09G 3/36* (2006.01)
(Continued)

(52) U.S. Cl.
CPC ............. *G09G 3/38* (2013.01); *G09G 3/3233* (2013.01); *G09G 2300/0819* (2013.01);
(Continued)

(58) Field of Classification Search
CPC ............... G09G 3/3233; G09G 3/3266; G09G 2310/0286; G09G 2300/0819
See application file for complete search history.

(56) References Cited

U.S. PATENT DOCUMENTS 9,224,335 B2 12/2015 Yoon et al.
2006/0262074 A1* 11/2006 Shimoda ................ G11C 19/28
345/100
(Continued)

FOREIGN PATENT DOCUMENTS

CN 103400548 A 11/2013
CN 103915061 A 7/2014
(Continued)

OTHER PUBLICATIONS

International Search Report and Written Opinion, including English translation of Box No. V of the Written Opinion, for International Application No. PCT/CN2015/100139, dated Feb. 26, 2016, 12 pages.
(Continued)

*Primary Examiner* — Nan-Ying Yang
(74) *Attorney, Agent, or Firm* — Westman, Champlin & Koehler, P.A.

(57) ABSTRACT

The present disclosure discloses a pixel driving circuit and a driving method thereof, a display panel and a display apparatus, and relates to a field of display technology, in order to solve a problem of the conventional light-emitting element being unable to emit light within a short period of time during which no current flows through the light-emitting element so that the conventional display apparatus has a bad display effect. The pixel driving circuit comprises a first input module, a second input module, a charging module for charging a storage module, the storage module for storing quantity of electricity between a compensation module and a light-emitting element, a power supply control
(Continued)

module, the compensation module, a driving module for providing the light-emitting element with a signal of a DC power supply signal terminal and a light-emitting element. The pixel driving circuit provided by the present disclosure is applied in the display apparatus.

20 Claims, 3 Drawing Sheets

(51) Int. Cl.

| | |
|---|---|
| ***G06F 3/038*** | (2013.01) |
| ***G09G 5/00*** | (2006.01) |
| ***G09G 3/38*** | (2006.01) |
| ***G09G 3/3233*** | (2016.01) |

(52) U.S. Cl.

CPC ............... *G09G 2300/0842* (2013.01); *G09G 2310/0262* (2013.01); *G09G 2320/029* (2013.01); *G09G 2320/0233* (2013.01); *G09G 2320/043* (2013.01); *G09G 2320/045* (2013.01); *G09G 2360/16* (2013.01)

(56) References Cited

U.S. PATENT DOCUMENTS

| | | | | |
|---|---|---|---|---|
| 2010/0193784 | A1* | 8/2010 | Morosawa | .......... H01L 29/7869 257/43 |
| 2013/0207957 | A1 | 8/2013 | Lin et al. | |
| 2015/0084843 | A1 | 3/2015 | Li et al. | |

FOREIGN PATENT DOCUMENTS

| | | | | | |
|---|---|---|---|---|---|
| CN | 104157234 | A | | 11/2014 | |
| CN | 104157241 | A | * | 11/2014 | ............... G09G 3/32 |
| CN | 104916266 | A | | 9/2015 | |

OTHER PUBLICATIONS

First Office Action, including Search Report, for Chinese Patent Application No. 201510409338.7, dated Jun. 14, 2016, 7 pages.

* cited by examiner

PIXEL DRIVING CIRCUIT AND DRIVING METHOD THEREOF, DISPLAY PANEL AND DISPLAY APPARATUS

CROSS-REFERENCE TO RELATED APPLICATIONS

This Application is a Section 371 National Stage Application of International Application No. PCT/CN2015/100139, filed 31 Dec. 2015, entitled "PIXEL DRIVING CIRCUIT AND DRIVING METHOD THEREOF, DISPLAY PANEL AND DISPLAY APPARATUS", which has not yet published, and which claims priority to Chinese Application No. 201510409338.7, filed on 13 Jul. 2015, incorporated herein by reference in their entirety.

TECHNICAL

The present disclosure relates to a field of display technology, and in particular, to a pixel driving circuit and a driving method thereof, a display panel and a display apparatus.

BACKGROUND

In a display apparatus, a display panel is one of important components in the display apparatus for implementing a display function. The display panel includes a pixel driving circuit, in which a light-emitting element is included. The pixel driving circuit provides its internal light-emitting element with current to enable the light-emitting element to emit light, so as to implement the display function of the display apparatus.

However, inventors of the present disclosure found during research and development that in conventional solutions of pixel driving circuits, when the light-emitting element is in a light-emitting phase, the display apparatus cannot display a picture completely until the light-emitting element is pre-charged for about 2 s; there is no current flowing through the light-emitting element during the period of about 2 s for pre-charging the light-emitting element; and the light-emitting element needs to be pre-charged when the display apparatus begins to display each frame of picture; thus, there is always a short period of time during which no current flows through the light-emitting element, when the display apparatus starts to display each frame of picture; and the display apparatus cannot display the picture completely within such a short period of time during which no current flows through the light-emitting element. Therefore, a display effect of the display apparatus is reduced.

SUMMARY

An object of the present disclosure is to provide a pixel driving circuit and a driving method thereof, a display panel and a display apparatus, which enable the light-emitting element in the pixel driving circuit always to emit light during the light-emitting phase, so as to improve the display effect of the display apparatus.

In order to achieve the above object, the present disclosure provides technical solutions as follows.

In a first aspect, the present disclosure provides a pixel driving circuit, comprising: a first input module, a second input module, a charging module, a storage module, a power supply control module, a compensation module, a driving module and a light-emitting element, wherein a control terminal of the first input module is connected to a first scan signal terminal, an input terminal of the first input module is connected to a data signal terminal, and an output terminal of the first input module is connected to an input terminal of the second input module and an input terminal of the driving module, the first input module being configured to transmit a signal of the data signal terminal to the second input module and the driving module under control of a signal of the first scan signal terminal;

a control terminal of the second input module is connected to the first scan signal terminal, an input terminal of the second input module is connected to an output terminal of the first input terminal, and an output terminal of the second input module is connected to an output terminal of the compensation module and a control terminal of the driving module, the second input module being configured to transmit the signal of the data signal terminal from the first input terminal to the driving module under control of the signal of the first scan signal terminal;

a control terminal of the charging module is connected to the first scan signal terminal, an input terminal of the charging module is connected to a reference voltage terminal, and an output terminal of the charging module is connected to a first terminal of the storage module, the charging module being configured to charge the storage module by using a signal of the reference voltage terminal under control of the signal of the first scan signal terminal;

the first terminal of the storage module is connected to the output terminal of the charging module and an input terminal of the compensation module, and a second terminal of the storage module is connected to the light-emitting element and an output terminal of the driving module, the storage module being configured to store quantity of electricity between the compensation module and the light-emitting element;

a control terminal of the power supply control module is connected to a second scan signal terminal, an input terminal of the power supply control module is connected to a direct current DC power supply signal terminal, and an output terminal of the power supply control module is connected to the input terminal of the driving module, the power supply control module being configured to transmit a signal of the DC power supply signal terminal to the driving module under control of a signal of the second scan signal terminal;

a control terminal of the compensation module is connected to the second scan signal terminal, an input terminal of the compensation module is connected to the first terminal of the storage module, and the output terminal of the compensation module is connected to the control terminal of the driving module, the compensation module being configured to transmit the quantity of electricity stored in the storage module to the driving module under control of the signal of the second scan signal terminal;

the control terminal of the driving module is connected to the output terminal of the second input module and the output terminal of the compensation module, the input terminal of the driving module is connected to the output terminal of the first input terminal and the output terminal of the power supply control module, and the output terminal of the driving module is connected to the second terminal of the storage module and the light-emitting element, the driving module being configured to transmit the signal of the data signal terminal from the first input module to the storage module and the light-emitting element under control of the second input module; and to provide the light-emitting element with the signal of the DC power supply signal terminal under control of the compensation module, according to the quantity of electricity stored in the storage module; and one terminal of the light-emitting element is connected to the second terminal of the storage module and the output terminal of the driving module, and the other terminal of the light-emitting element is connected to an alternating current AC power supply signal terminal, the light-emitting element being configured to receive the signal of the DC power supply signal terminal, and to emit light.

In a second aspect, the present disclosure provides a driving method of a pixel driving circuit for driving the pixel driving circuit in the above technical solutions. The driving method comprises:

in a first phase, all of the signal of the first scan signal terminal, the signal of the data signal terminal and the signal of the reference voltage terminal are high-level signals, the signal of the second scan signal terminal is a low-level signal, a signal of the AC power supply signal terminal is a first low-level signal; the first input module transmits the high-level signal of the data signal terminal to the second input module and the driving module under control of the high-level signal of the first scan signal terminal; the second input module transmits the high-level signal of the data signal terminal which is transmitted from the first input module to the driving module under control of the high-level signal of the first scan signal terminal; the driving module transmits the high-level signal of the data signal terminal which is transmitted from the first input module to the storage module and the light-emitting element under control of the high-level signal of the data signal terminal which is transmitted from the second input module; and the charging module charges the storage module by using the high-level signal of the reference voltage terminal under control of the high-level signal of the first scan signal terminal;

in a second phase, all of the signal of the first scan signal terminal, the signal of the data signal terminal and the signal of the reference voltage terminal are low-level signals, both the signal of the second scan signal terminal and the signal of the DC power supply signal terminal are high-level signals, the signal of the AC power supply signal terminal is a second low-level signal, a voltage of which being higher than that of the first low-level signal; the power supply control module transmits the signal of the DC power supply signal terminal to the driving module under control of the high-level signal of the second scan signal terminal; the compensation module transmits the quantity of electricity stored in the storage module to the driving module under control of the high-level signal of the second scan signal terminal; and the driving module provides the light-emitting element with the high-level signal of the DC power supply signal terminal from the power supply control module so as to enable the light-emitting element to emit light, under control of the compensation module, according to the quantity of electricity stored in the storage module.

In a third aspect, the present disclosure provides a display panel, comprising the pixel driving circuit according to any of the above technical solutions.

In a fourth aspect, the present disclosure provides a display apparatus, comprising the display panel according to any of the above technical solutions.

In the pixel driving circuit and the driving method thereof, the display panel and the display apparatus provided by the present disclosure, the signal of the data signal terminal can be transmitted to the driving module by the first input module and the second input module, the signal of the data signal terminal is transmitted by the driving module to the storage module and the light-emitting element, and the storage module is charged by the charging module. During the light-emitting phase, the quantity of electricity stored previously by the storage module is transmitted to the driving module, and the driving module provides the light-emitting element with the signal of the DC power supply signal terminal according to the quantity of electricity stored in the storage module, so that the there is always current flowing through the light-emitting element during the light-emitting phase, thereby the light-emitting element always emitting light. Compared to the conventional pixel driving circuit for which there is always a short period of time during which no current flows through the light-emitting element, there is always current flowing through the light-emitting element in the pixel driving circuit of the present disclosure during the light-emitting phase, and the light-emitting element is always emitting light during the light-emitting phase. Therefore, the display effect of the display apparatus may be improved.

BRIEF DESCRIPTION OF THE DRAWINGS

The drawings illustrated here are used for further explanation of the present disclosure, which constitute a part of the present disclosure. Exemplary embodiments of the present disclosure and explanation thereof are used for illustrating the present disclosure, but do not constitute any inappropriate limitations on the present disclosure. In the drawings.

DETAILED DESCRIPTION

Hereinafter, a pixel driving circuit and a driving method thereof, a display panel and a display apparatus provided by embodiments of the present disclosure will be described in detail with reference to the drawings for further illustrations thereof.

First Embodiment

Figure 1:
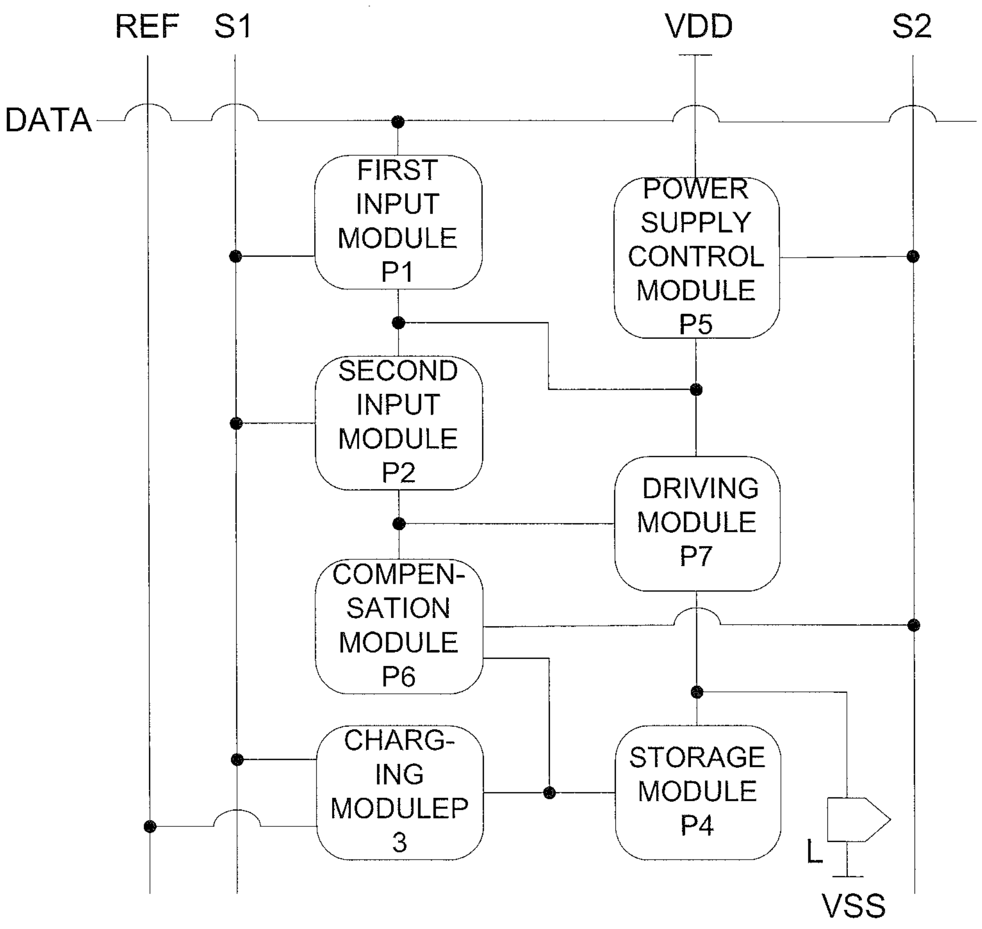
FIG. 1 is a structure schematic diagram of a pixel driving circuit according to a first embodiment of the present disclosure.

With reference to FIG. 1, a pixel driving circuit provided by an embodiment of the present disclosure comprises a first input module P1, a second input module P2, a charging module P3, a storage module P4, a power supply control module P5, a compensation module P6, a driving module P7 and a light-emitting element L. The first input module P1 is connected to a first scan signal terminal S1, a data signal terminal DATA, the second input module P2 and the driving module P7. In particular, a control terminal of the first input module P1 is connected to the first scan signal terminal S1, an input terminal of the first input module P1 is connected to the data signal terminal DATA, and an output terminal of the first input module P1 is connected to an input terminal of the second input module P2 and an input terminal of the driving module P7. The first input module P1 is configured to transmit a signal of the data signal terminal DATA to the second input module P2 and the driving module P7 under control of a signal of the first scan signal terminal S1. The second input module P2 is connected to the first scan signal terminal S1, the first input module P1, the compensation module P6 and the driving module P7. In particular, a control terminal of the second input module P2 is connected to the first scan signal terminal S1, an input terminal of the second input module P2 is connected to an output terminal of the first input module P1, and an output terminal of the second input module P2 is connected to an output terminal of the compensation module P6 and a control terminal of the driving module P7. The second input module P2 is configured to transmit the signal of the data signal terminal DATA from the first input terminal P1 to the driving module P7 under control of the signal of the first scan signal terminal S1. The charging module P3 is connected to the first scan signal terminal S1, a reference voltage terminal REF and a storage module P4. In particular, a control terminal of the charging module P3 is connected to the first scan signal terminal S1, an input terminal of the charging module P3 is connected to the reference voltage terminal REF, and an output terminal of the charging module P3 is connected to a first terminal of the storage module P4. The charging module P3 is configured to charge the storage module P4 by using a signal of the reference voltage terminal REF under control of the signal of the first scan signal terminal S1. The storage module P4 is connected to the charging module P3, the driving module P7, the compensation module P6 and the light-emitting element L. In particular, the first terminal of the storage module P4 is connected to the output terminal of the charging module P3 and an input terminal of the compensation module P6, and a second terminal of the storage module P4 is connected to the light-emitting element L and an output terminal of the driving module P7. The storage module P4 is configured to store quantity of electricity between the compensation module P6 and the light-emitting element L. The power supply control module P5 is connected to a second scan signal terminal S2, a direct current (DC) power supply signal terminal VDD and the driving module P7. In particular, a control terminal of the power supply control module P5 is connected to the second scan signal terminal S2, an input terminal of the power supply control module P5 is connected to the DC power supply signal terminal, and an output terminal of the power supply control module P5 is connected to the input terminal of the driving module P7. The power supply control module P5 is configured to transmit a signal of the DC power supply signal terminal VDD to the driving module P7 under control of a signal of the second scan signal terminal S2. The compensation module P6 is connected to the second scan signal terminal S2, the storage module P4 and the driving module P7. In particular, a control terminal of the compensation module P6 is connected to the second scan signal terminal, an input terminal of the compensation module P6 is connected to the first terminal of the storage module P4, and an output terminal of the compensation module P6 is connected to the control terminal of the driving module P7. The compensation module P6 is configured to transmit the quantity of electricity stored in the storage module P4 to the driving module P7 under control of the signal of the second scan signal terminal S2. The driving module P7 is connected to the first input module P1, the second input module P2, the compensation module P6, the power supply control module P5, the storage module P4 and the light-emitting element L. In particular, the control terminal of the driving module P7 is connected to the output terminal of the second input module P2 and the output terminal of the compensation module P6, the input terminal of the driving module P7 is connected to the output terminal of the first input terminal P1 and the output terminal of the power supply control module P5, and the output terminal of the driving module P7 is connected to a second terminal of the storage module P4 and the light-emitting element L. The driving module P7 is configured to transmit the signal of the data signal terminal DATA from the first input module P1 to the storage module P4 and the light-emitting element L under control of the second input module P2; and to provide the light-emitting element L with the signal of the DC power supply signal terminal VDD under control of the compensation module P6, according to the quantity of electricity stored in the storage module P4. The light-emitting module L is connected to the storage module P4, the driving module P7 and an alternating current (AC) power supply signal terminal VSS. In particular, one terminal of the light-emitting element L is connected to the second terminal of the storage module P4 and the output terminal of the driving module P7, and the other terminal of the light-emitting element L is connected to the AC power supply signal terminal. The light-emitting element L is configured to receive the signal of the DC power supply signal terminal VDD, and to emit light.

Figure 2:
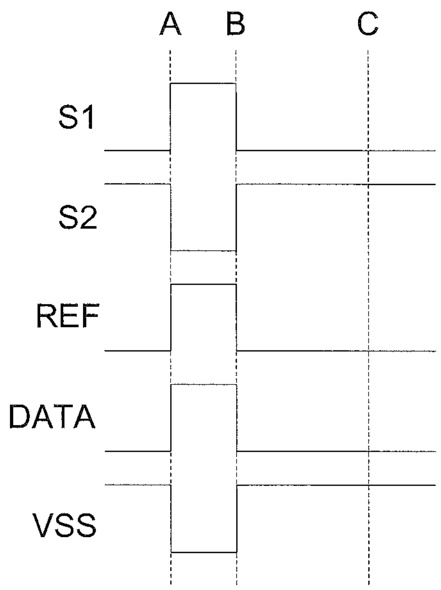
FIG. 2 is a signal timing sequence corresponding to the pixel driving circuits in FIGS. 1 and 3.

Hereinafter, a driving method of the pixel driving circuit as described above will be illustrated with reference to FIG. 2. As shown in FIG. 2, the driving method of the pixel driving circuit comprises two phases.

A first phase may be referred to as a compensation phase (A-B phase). All of the signal of the first scan signal terminal S1, the signal of the data signal terminal DATA and the signal of the reference voltage terminal REF are high-level signals, the signal of the second scan signal terminal S2 is a low-level signal, the signal of the AC power supply signal terminal VSS is a first low-level signal. The first input module P1 transmits the high-level signal of the data signal terminal DATA to the second input module P2 and the driving module P7 under control of the high-level signal of the first scan signal terminal. The second input module P2 transmits the high-level signal of the data signal terminal DATA which is transmitted from the first input module P1 to the driving module P7 under control of the high-level signal of the first scan signal terminal. The driving module P7 transmits the high-level signal of the data signal terminal DATA which is transmitted from the first input module P1 to the storage module P4 and the light-emitting element L under control of the high-level signal of the data signal terminal DATA which is transmitted from the second input module P2. The charging module P3 charges the storage module P4 by using the high-level signal of the reference voltage terminal REF under control of the high-level signal of the first scan signal terminal S1.

A second phase may be referred to as a light-emitting phase (B-C phase). All of the signal of the first scan signal terminal S1, the signal of the data signal terminal DATA and the signal of the reference voltage terminal REF are low-level signals, both the signal of the second scan signal terminal S2 and the signal of the DC power supply signal terminal VDD are high-level signals, the signal of the AC power supply signal terminal VSS is a second low-level signal, a voltage of which being higher than that of the first low-level signal. The power supply control module P5 transmits the signal of the DC power supply signal terminal VDD to the driving module P7 under control of the high-level signal of the second scan signal terminal S2. The compensation module P6 transmits the quantity of electricity stored in the storage module P4 to the driving module P7 under control of the high-level signal of the second scan signal terminal S2. The driving module P7 provides the light-emitting element L with the high-level signal of the DC power supply signal terminal VDD from the power supply control module P5 so as to enable the light-emitting element L to emit light, under control of the compensation module P6, according to the quantity of electricity stored in the storage module P4.

It should be noted that the signal of the DC power supply signal terminal VDD is always a high-level signal, and the signal of the AC power supply signal terminal VSS is used for compensating the light-emitting L, wherein the signal of the AC power supply signal terminal VSS is the first low-level signal or the second low-level signal, both the voltages of the first low-level signal and the second low-level signal are negative values, but the voltage of the first low-level signal is lower than that of the second low-level signal, e.g. the voltage of the first low-level signal is −2V, and the voltage of the second low-level signal is −1V.

In the pixel driving circuit and the driving method thereof provided by the embodiments of the present disclosure, the signal of the data signal terminal DATA can be transmitted to the driving module P7 by the first input module P1 and the second input module P2, the signal of the data signal terminal DATA is transmitted by the driving module P7 to the storage module P4 and the light-emitting element L, and the storage module P4 is charged by the charging module P3. During the light-emitting phase, the quantity of electricity stored previously by the storage module P4 is transmitted to the driving module P7, and the driving module P7 provides the light-emitting element L with the signal of the DC power supply signal terminal VDD according to the quantity of electricity stored in the storage module P4, so that the there is always current flowing through the light-emitting element L during the light-emitting phase, thereby the light-emitting element L always emitting light. Compared to the conventional pixel driving circuit for which there is always a short period of time during which no current flows through the light-emitting element L, there is always current flowing through the light-emitting element L in the pixel driving circuit of the present disclosure during the light-emitting phase, and the light-emitting element L is always emitting light during the light-emitting phase. Therefore, the display effect of the display apparatus may be improved.

Second Embodiment

Hereinafter, particular structures of the first input module P1, the second input module P2, the charging module P3, the storage module P4, the power supply control module P5, the compensation module P6 and the driving module P7 in the first embodiment will be described in detail with reference to FIG. 3.

The first input module P1 comprises a first transistor T1, wherein a first electrode of the first transistor T1 is connected to the first scan signal terminal S1, a second electrode of the first transistor T1 is connected to a third electrode of a second transistor T2 in the second input module P2 and a third electrode of a fourth transistor T4 in the driving module P7, and a third electrode of the first transistor T1 is connected to the data signal terminal DATA. In the present embodiment, the first electrode of the first transistor T1 corresponds to the control terminal of the first input module P1, the second electrode of the first transistor T1 corresponds to the output terminal of the first input module P1, and the third electrode of the first transistor T1 corresponds to the input terminal of the first input module P1.

The second input module P2 comprises a second transistor T2, wherein a first electrode of the second transistor T2 is connected to the first scan signal terminal S1, a second electrode of the second transistor T2 is connected to a first electrode of a fourth transistor T4 in the driving module P7 and a third electrode of a fifth transistor T5 in the compensation module P6, and a third electrode of the second transistor T2 is connected to the second electrode of the first transistor T1 and the third electrode of the fourth transistor T4 in the driving module P7. In the present embodiment, the first electrode of the second transistor T2 corresponds to the control terminal of the second input module P2, the second electrode of the second transistor T2 corresponds to the output terminal of the second input module P2, and the third electrode of the second transistor T2 corresponds to the input terminal of the second input module P2.

The power supply control module P5 comprises a third transistor T3, wherein a first electrode of the third transistor T3 is connected to the second scan signal terminal S2, a second electrode of the third transistor T3 is connected to the third electrode of the fourth transistor T4 in the driving module P7, and a third electrode of the third transistor T3 is connected to the DC power supply signal terminal VDD. In the present embodiment, the first electrode of the third transistor T3 corresponds to the control terminal of the power supply control module P5, the second electrode of the third transistor T3 corresponds to the output terminal of the power supply control module P5, and the third electrode of the third transistor T3 corresponds to the input terminal of the power supply control module P5.

The driving module P7 comprises a fourth transistor T4, wherein a first electrode of the fourth transistor T4 is connected to the second electrode of the second transistor T2 and the third electrode of the fifth transistor T5 in the compensation module, a second electrode of the fourth transistor T4 is connected to a second terminal of a storage capacitor Cst in the storage module P4 and the light-emitting element L, and a third electrode of the fourth transistor T4 is connected to the second electrode of the first transistor T1 and the second electrode of the third transistor T3. In the present embodiment, the first electrode of the fourth transistor T4 corresponds to the control terminal of the driving module P7, the second electrode of the fourth transistor T4 corresponds to the output terminal of the driving module P7, and the third electrode of the fourth transistor T4 corresponds to the input terminal of the driving module P7.

The compensation module P6 comprises a fifth transistor T5, wherein a first electrode of the fifth transistor T5 is connected to the second scan signal terminal S2, a second electrode of the fifth transistor T5 is connected to a first terminal of the storage capacitor Cst in the storage module P4, and the third electrode of the fifth transistor T5 is connected to the first electrode of the fourth transistor T4. In the present embodiment, the first electrode of the fifth transistor T5 corresponds to the control terminal of the compensation module P6, the second electrode of the fifth transistor T5 corresponds to the input terminal of the compensation module P6, and the third electrode of the fifth transistor T5 corresponds to the output terminal of the compensation module P6.

The charging module P3 comprises a sixth transistor T6, wherein a first electrode of the sixth transistor T6 is connected to the first scan signal terminal S1, a second electrode of the sixth transistor T6 is connected to the first terminal of the storage capacitor Cst in the storage module P4, and a third electrode of the sixth transistor T6 is connected to the reference voltage terminal REF. In the present embodiment, the first electrode of the sixth transistor T6 corresponds to the control terminal of the charging module P3, the second electrode of the sixth transistor T6 corresponds to the output terminal of the charging module P3, and the third electrode of the sixth transistor T6 corresponds to the input terminal of the charging module P3.

The storage module P4 comprises a storage capacitor Cst, wherein the first terminal of the storage capacitor Cst is connected to the second electrode of the sixth transistor T6 and the second electrode of the fifth transistor T5, and the second terminal of the storage capacitor Cst is connected to the second electrode of the fourth transistor T4 and the light-emitting element L. In the present embodiment, the first terminal of the storage capacitor Cst corresponds to the first terminal of the storage module P4, and the second terminal of the storage capacitor Cst corresponds to the second terminal of the storage module P4.

The light-emitting element L may particularly be an electrochromic display (ECD) device. The ECD device is a device which may have an electrochemical oxidation-reduction reaction under an externally applied electric field so that color of electrochromic material of the prepared ECD device may change stably and reversibly. A display apparatus with the ECD device has advantages such as no blind corner, good energy conservation, higher contrast etc., compared to other display apparatuses. Therefore, the ECD device has been applied in the display field more widely.

It should be noted that the first electrode of each of the above transistors is a gate electrode, the second electrode of each of the above transistors is a source electrode, and the third electrode of each of the above transistors is a drain electrode; or the first electrode is the gate electrode, the second electrode is the drain electrode, and the third electrode is the source electrode. In the present embodiment, N-type transistors, the first electrode being the gate electrode, the second electrode being the source electrode, the third electrode being the drain electrode are taken as an example for illustration. However, the above transistors may also be P-type transistors, circuit designs in which the above transistors are P-type transistors also fall into the protection scope of the present disclosure.

Figure 3:
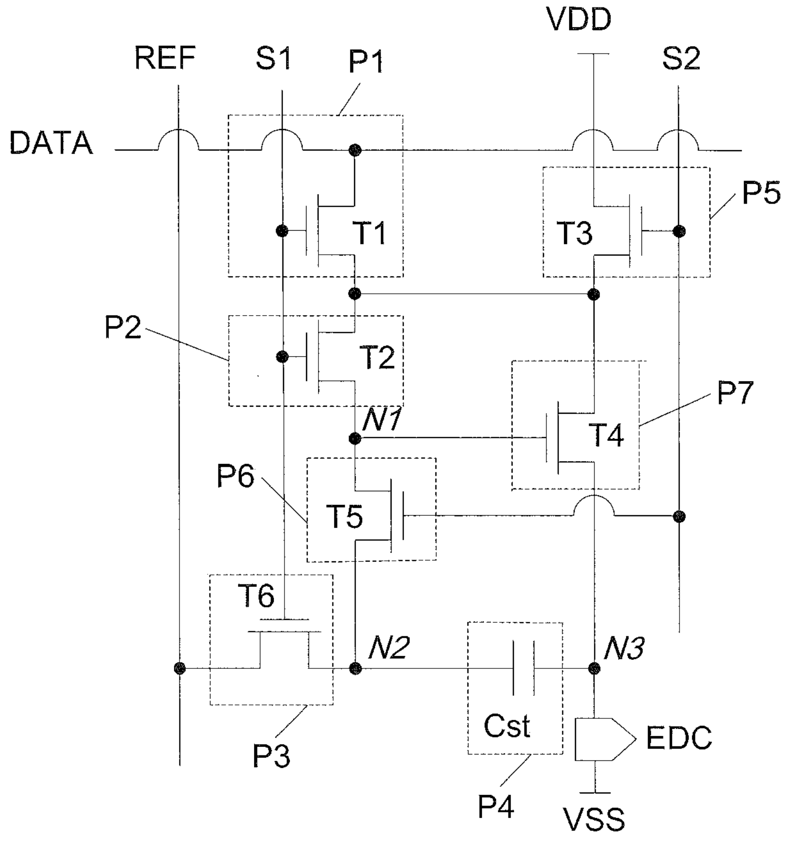
FIG. 3 is a structure schematic diagram of a pixel driving circuit according to a second embodiment of the present disclosure.

With reference to FIG. 2, FIG. 2 is a signal timing sequence corresponding to the pixel driving circuits in FIG. 3. Hereinafter, the driving method of the pixel driving circuit in the second embodiment will be described in detail in connection with FIG. 2, in which N-type transistors are used as an example of the respective transistors. The first phase in the second embodiment (i.e., the compensation phase) is A-B phase, and the second phase (i.e., the light-emitting phase) is B-C phase.

In the A-B phase, all of the signal of the first scan signal terminal S1, the signal of the data signal terminal DATA and the signal of the reference voltage terminal REF are high-level signals, the signal of the second scan signal terminal S2 is a low-level signal, the signal of the AC power supply signal terminal VSS is a first low-level signal. Both the first electrode of the third transistor and the first electrode of the fifth transistor receive the low-level signal of the second scan signal terminal S2, and both the third transistor and the fifth transistor are turned off. The first electrode of the first transistor T1 receives the high-level signal of the first scan signal terminal, and the first transistor is turned on for electrically connecting the second electrode and the third electrode of the first transistor T1, so as to transmit the high-level signal of the data signal terminal DATA to the third electrode of the second transistor T2 and the third electrode of the fourth transistor T4. The first electrode of the second transistor T2 receives the high-level signal of the first scan signal terminal S1, and the second transistor T2 is turned on for electrically connecting the second electrode and the third electrode of the second transistor T2, so as to transmit the high-level signal of the data signal terminal DATA which is transmitted from the first transistor T1 to the first electrode of the fourth transistor T4 The first electrode of the fourth transistor T4 receives the high-level signal of the data signal terminal DATA which is transmitted from the second transistor T2, and the fourth transistor T4 is turned on for electrically connecting the second electrode and the third electrode of the fourth transistor T4, so as to transmit the high-level signal of the data signal terminal DATA which is transmitted from the first transistor T1 to the storage capacitor Cst and the light-emitting element L. The first electrode of the sixth transistor T6 receives the high-level signal of the first scan signal terminal S1, and the sixth transistor T6 is turned on for electrically connecting the second electrode and the third electrode of the sixth transistor T6, so as to charge the storage capacitor Cst by using the high-level signal of the reference voltage terminal REF.

In the B-C phase, all of the signal of the first scan signal terminal S1, the signal of the data signal terminal DATA and the signal of the reference voltage terminal REF are low-level signals, both the signal of the second scan signal terminal S2 and the signal of the DC power supply signal terminal VDD are high-level signals, the signal of the AC power supply signal terminal VSS is a second low-level signal. All of the first electrode of the first transistor T1, the first electrode of the second transistor T2 and the first electrode of the sixth transistor T6 receive the low-level signal of the first scan signal terminal S1, and all of the first transistor T1, the second transistor T2 and the sixth transistor T6 are turned off. The first electrode of the third transistor T3 receives the high-level signal of the second scan signal terminal S2, and the third transistor is turned on for electrically connecting the second electrode and the third electrode of the third transistor T3 on, so as to transmit the high-level signal of the DC power supply signal terminal VDD to the third electrode of the fourth transistor T4. The first electrode of the fifth transistor T5 receives the high-level signal of the second scan signal terminal S2, and the fifth transistor T5 is turned on for electrically connecting the second electrode and the third electrode of the third transistor T5. Since the storage capacitor Cst is charged by using the high-level signal of the reference voltage terminal REF in the first phase, the storage capacitor Cst, due to a coupling effect, is still maintained in a high-level state which is reached after being charged in the first phase, and the fifth transistor T5 transmits the high-level signal of the storage capacitor Cst to the first electrode of the fourth transistor T4. The first electrode of the fourth transistor T4 receives the high-level signal of the storage capacitor which is transmitted from the fifth transistor T5, and the fourth transistor T4 is turned on for electrically connecting the second electrode and the third electrode of the fourth transistor T4, so as to transmit the high-level signal of the DC power supply signal terminal VDD which is transmitted from the third transistor T3 to the electrochromic display ECD device in order to enable the electrochromic display ECD device to emit light. Therefore, in the light-emitting phase, the electrochromic display ECD device can always emit light, thereby improving the display effect of the display apparatus with the electrochromic display ECD device.

It should be noted that in the compensation phase, a voltage at a N1 node in the pixel driving circuit is identical with that of the signal of the data signal terminal DATA, which is represented as $V_{DATA}$; a voltage at a N2 node is identical with that of the signal of the reference voltage terminal REF, which is represented as $V_{REF}$; a threshold voltage of the fourth transistor T4 is $V_{th}$; a voltage at a N3 node is $V_{DATA}-V_{th}$. After the compensation phase is ended, a voltage across the storage capacitor Cst is a difference between the voltage at N2 and the voltage at N3, i.e., $V_{REF}-V_{DATA}+V_{th}$.

In the light-emitting phase, a voltage across the electrochromic display ECD device is represented as $V_{ECD}$, the voltage at N3 is a sum of a voltage $V_{SS}$ pf the signal of the AC signal terminal $V_{SS}$ and $V_{ECD}$, i.e., $V_{SS}+V_{ECD}$; due to the coupling effect, the storage capacitor Cst maintains the voltage $V_{REF}-V_{DATA}+V_{th}$ across the storage capacitor Cst in the compensation phase. The fifth transistor T5 is turned on, the voltage at N2 is identical with the voltage at N1. A voltage between the first electrode and the second electrode of the fourth transistor T4 is identical with the voltage across the storage capacitor Cst, i.e., $V_{REF}-V_{DATA}+V_{th}$; thus, a current flowing through the second electrode of the fourth transistor T4, i.e., a current $I_{ECD}$ input into the electrochromic display ECD device, is calculated by a formula $I_{ECD}=(½)*\mu_n*C_{OX}*(W/L)*(V_{REF}-V_{DATA}+V_{th}-V_{th})^2=(½)*\mu_n*C_{OX}*(W/L)*(V_{REF}-V_{DATA})^2$, wherein $\mu_n$ is an electron mobility of the fourth transistor T4, $C_{OX}$ is equivalent capacitance of the fourth transistor T4, W/L is a width to length ratio of a channel of the fourth transistor T4. According to the formula of calculating $I_{EcD}$, the current $I_{ECD}$ input into the electrochromic display ECD device is independent of the voltage across the electrochromic display ECD device, and is independent of the threshold voltage $V_{th}$ of the fourth transistor T4. The pixel driving circuit of the embodiments of the present disclosure may further avoid a phenomenon of uneven display brightness of the display apparatus caused by drifting of the threshold voltage $V_{th}$ of the fourth transistor T4, which further improves further improve the display effect of the display apparatus with the electrochromic display ECD device.

Third Embodiment

An embodiment of the present disclosure further provides a display panel, which comprises the pixel driving circuits in the above embodiments as described above. The pixel driving circuit in the display panel and the pixel driving circuits in the above embodiments have the same advantages, and thus description thereof will be omitted for simplicity.

Fourth Embodiment

An embodiment of the present disclosure further provides a display apparatus, which comprises the display panel in the above embodiments as described above. The display panel in the display apparatus and the display panel in the above embodiment have the same advantages, and thus description thereof will be omitted for simplicity. Particularly, the display panel may be e-paper, a mobile phone, a tablet, a TV, a display, a notebook, a digital frame, a navigator and any other products or components having a display function.

In the descriptions of the embodiments as described above, particular features, structures, materials or features may be combined in appropriate ways in any one or more embodiments or examples.

The above descriptions are merely particular embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure as defined by the claims and their equivalents.

We claim:

1. A pixel driving circuit, comprising a first input module, a second input module, a charging module, a storage module, a power supply control module, a compensation module, a driving module and a light-emitting element, wherein a control terminal of the first input module is connected to a first scan signal terminal, an input terminal of the first input module is connected to a data signal terminal, and an output terminal of the first input module is directly connected to an input terminal of the second input module and an input terminal of the driving module, the first input module being configured to transmit a signal of the data signal terminal to the second input module and the driving module under control of a signal of the first scan signal terminal;

a control terminal of the second input module is connected to the first scan signal terminal, an input terminal of the second input module is connected to the output terminal of the first input terminal, and an output terminal of the second input module is connected to an output terminal of the compensation module and a control terminal of the driving module, the second input module being configured to transmit the signal of the data signal terminal from the first input terminal to the driving module under control of the signal of the first scan signal terminal;

a control terminal of the charging module is connected to the first scan signal terminal, an input terminal of the charging module is connected to a reference voltage terminal, and an output terminal of the charging module is connected to a first terminal of the storage module, the charging module being configured to charge the storage module by using a signal of the reference voltage terminal under control of the signal of the first scan signal terminal;

the first terminal of the storage module is connected to the output terminal of the charging module and an input terminal of the compensation module, and a second terminal of the storage module is connected to the light-emitting element and an output terminal of the driving module, the storage module being configured to store quantity of electricity between the compensation module and the light-emitting element;

a control terminal of the power supply control module is connected to a second scan signal terminal, an input terminal of the power supply control module is connected to a direct current DC power supply signal terminal, and an output terminal of the power supply control module is connected to the input terminal of the driving module, the power supply control module being configured to transmit a signal of the DC power supply signal terminal to the driving module under control of a signal of the second scan signal terminal;

a control terminal of the compensation module is connected to the second scan signal terminal, the input terminal of the compensation module is connected to the first terminal of the storage module, and the output terminal of the compensation module is connected to the control terminal of the driving module, the compensation module being configured to transmit the quantity of electricity stored in the storage module to the driving module under control of the signal of the second scan signal terminal;

the control terminal of the driving module is connected to the output terminal of the second input module and the output terminal of the compensation module, the input terminal of the driving module is connected to the output terminal of the first input terminal and the output terminal of the power supply control module, and the output terminal of the driving module is connected to the second terminal of the storage module and the light-emitting element, the driving module being configured to transmit the signal of the data signal terminal from the first input module to the storage module and the light-emitting element under control of the single of the data signal terminal from the output terminal of the second input module; and to provide the light-emitting element with the signal of the DC power supply signal terminal under control of the compensation module, according to the quantity of electricity stored in the storage module; and one terminal of the light-emitting element is connected to the second terminal of the storage module and the output terminal of the driving module, and the other terminal of the light-emitting element is connected to an alternating current AC power supply signal terminal, the light-emitting element being configured to receive the signal of the DC power supply signal terminal, and to emit light.

2. The pixel driving circuit according to claim 1, wherein the first input module comprises:

a first transistor, wherein a first electrode of the first transistor is connected to the first scan signal terminal, a second electrode of the first transistor is connected to the input terminal of the second input module and the input terminal of the driving module, and a third electrode of the first transistor is connected to the data signal terminal.

3. The pixel driving circuit according to claim 2, wherein the second input module comprises:

a second transistor, wherein a first electrode of the second transistor is connected to the first scan signal terminal, a second electrode of the second transistor is connected to the control terminal of the driving module and the output terminal of the compensation module, and a third electrode of the second transistor is connected to the second electrode of the first transistor and the control terminal of the driving module.

4. The pixel driving circuit according to claim 3, wherein the power supply control module comprises:

a third transistor, wherein a first electrode of the third transistor is connected to the second scan signal terminal, a second electrode of the third transistor is connected to the input terminal of the driving module, and a third electrode of the third transistor is connected to the DC power supply signal terminal.

5. The pixel driving circuit according to claim 4, wherein the driving module comprises:

a fourth transistor, wherein a first electrode of the fourth transistor is connected to the second electrode of the second transistor and the output terminal of the compensation module, a second electrode of the fourth transistor is connected to the second terminal of the storage module and the light-emitting element, and a third electrode of the fourth transistor is connected to the second electrode of the first transistor and the second electrode of the third transistor.

6. The pixel driving circuit according to claim 5, wherein the compensation module comprises:

a fifth transistor, wherein a first electrode of the fifth transistor is connected to the second scan signal terminal, a second electrode of the fifth transistor is connected to the first terminal of the storage module, and a third electrode of the fifth transistor is connected to the first electrode of the fourth transistor.

7. The pixel driving circuit according to claim 6, wherein the charging module comprises:

a sixth transistor, wherein a first electrode of the sixth transistor is connected to the first scan signal terminal, a second electrode of the sixth transistor is connected to the first terminal of the storage module, and a third electrode of the sixth transistor is connected to the reference voltage terminal.

8. The pixel driving circuit according to claim 7, wherein the storage module comprises:

a storage capacitor, wherein a first terminal of the storage capacitor is connected to the second electrode of the sixth transistor and the second electrode of the fifth transistor, and a second terminal of the storage capacitor is connected to the second electrode of the fourth transistor and the light-emitting element.

9. The pixel driving circuit according to claim 1, wherein the light-emitting element is an electrochromic display device.

10. A driving method of a pixel driving circuit for driving the pixel driving circuit according to claim 1, comprising:

in a first phase, all of the signal of the first scan signal terminal, the signal of the data signal terminal and the signal of the reference voltage terminal are high-level signals, the signal of the second scan signal terminal is a low-level signal, a signal of the AC power supply signal terminal is a first low-level signal; the first input module transmits the high-level signal of the data signal terminal to the second input module and the driving module under control of the high-level signal of the first scan signal terminal; the second input module transmits the high-level signal of the data signal terminal which is transmitted from the first input module to the driving module under control of the high-level signal of the first scan signal terminal; the driving module transmits the high-level signal of the data signal terminal which is transmitted from the first input module to the storage module and the light-emitting element under control of the high-level signal of the data signal terminal which is transmitted from the second input module; and the charging module charges the storage module by using the high-level signal of the reference voltage terminal under control of the high-level signal of the first scan signal terminal; and in a second phase, all of the signal of the first scan signal terminal, the signal of the data signal terminal and the signal of the reference voltage terminal are low-level signals, both the signal of the second scan signal terminal and the signal of the DC power supply signal terminal are high-level signals, the signal of the AC power supply signal terminal is a second low-level signal, a voltage of which being higher than that of the first low-level signal; the power supply control module transmits the signal of the DC power supply signal terminal to the driving module under control of the high-level signal of the second scan signal terminal; the compensation module transmits the quantity of electricity stored in the storage module to the driving module under control of the high-level signal of the second scan signal terminal; and the driving module provides the light-emitting element with the high-level signal of the DC power supply signal terminal from the power supply control module so as to enable the light-emitting element to emit light, under control of the compensation module, according to the quantity of electricity stored in the storage module.

11. A driving method of a pixel driving circuit for driving the pixel driving circuit according to claim 9, comprising:

in a first phase, all of the signal of the first scan signal terminal, the signal of the data signal terminal and the signal of the reference voltage terminal are high-level signals, the signal of the second scan signal terminal is a low-level signal, a signal of the AC power supply signal terminal is a first low-level signal; the first input module transmits the high-level signal of the data signal terminal to the second input module and the driving module under control of the high-level signal of the first scan signal terminal; the second input module transmits the high-level signal of the data signal terminal which is transmitted from the first input module to the driving module under control of the high-level signal of the first scan signal terminal; the driving module transmits the high-level signal of the data signal terminal which is transmitted from the first input module to the storage module and the light-emitting element under control of the high-level signal of the data signal terminal which is transmitted from the second input module; and the charging module charges the storage module by using the high-level signal of the reference voltage terminal under control of the high-level signal of the first scan signal terminal; and in a second phase, all of the signal of the first scan signal terminal, the signal of the data signal terminal and the signal of the reference voltage terminal are low-level signals, both the signal of the second scan signal terminal and the signal of the DC power supply signal terminal are high-level signals, the signal of the AC power supply signal terminal is a second low-level signal, a voltage of which being higher than that of the first low-level signal; the power supply control module transmits the signal of the DC power supply signal terminal to the driving module under control of the high-level signal of the second scan signal terminal; the compensation module transmits the quantity of electricity stored in the storage module to the driving module under control of the high-level signal of the second scan signal terminal; and the driving module provides the light-emitting element with the high-level signal of the DC power supply signal terminal from the power supply control module so as to enable the light-emitting element to emit light, under control of the compensation module, according to the quantity of electricity stored in the storage module, wherein the first phase comprises:

the low-level signal of the second scan signal terminal being received by the first electrode of the third transistor and the first electrode of the fifth transistor, and both the third transistor and the fifth transistor being turned off;

the high-level signal of the first scan signal terminal being received by the first electrode of the first transistor, and the first transistor being turned on for transmitting the high-level signal of the data signal terminal to the third electrode of the second transistor and the third electrode of the fourth transistor;

the high-level signal of the first scan signal terminal being received by the first electrode of the second transistor, and the second transistor being turned on for transmitting the high-level signal of the data signal terminal to the first electrode of the fourth transistor;

the high-level signal of the data signal terminal being received by the first electrode of the fourth transistor, and the fourth transistor being turned on for transmitting the high-level signal of the data signal terminal to the storage capacitor and the electrochromic display device; and the high-level signal of the first scan signal terminal being received by the first electrode of the sixth transistor, and the sixth transistor being turned on for charging the storage capacitor by using the high-level signal of the reference voltage terminal.

12. The driving method of the pixel driving circuit according to claim 11, wherein the second phase particularly comprises:

the low-level signal of the first scan signal terminal being received by the first electrode of the first transistor, the first electrode of the second transistor and the first electrode of the sixth transistor, and all of the first transistor, the second transistor and the sixth transistor being turned off;

the high-level signal of the second scan signal terminal being received by the first electrode of the third transistor, and the third transistor being turned on for transmitting the high-level signal of the DC power supply signal terminal to the third electrode of the fourth transistor;

the high-level signal of the second scan signal terminal being received by the first electrode of the fifth transistor, and the fifth transistor being turned on for transmitting the high-level signal of the storage capacitor which is maintained in the first phase to the first electrode of the fourth transistor;

the high-level signal of the storage capacitor being received by the first electrode of the fourth transistor, and the fourth transistor being turned on for transmitting the high-level signal of the DC power supply signal terminal to the electrochromic display device so as to enable the electrochromic display device to emit light.

13. A display panel, comprising the pixel driving circuit according to claim 1.

14. A display apparatus, comprising the display panel according to claim 13.

15. The pixel driving circuit according to claim 13, wherein the first input module comprises:

a first transistor, wherein a first electrode of the first transistor is connected to the first scan signal terminal, a second electrode of the first transistor is connected to the input terminal of the second input module and the input terminal of the driving module, and a third electrode of the first transistor is connected to the data signal terminal.

16. The pixel driving circuit according to claim 15, wherein the second input module comprises:

a second transistor, wherein a first electrode of the second transistor is connected to the first scan signal terminal, a second electrode of the second transistor is connected to the control terminal of the driving module and the output terminal of the compensation module, and a third electrode of the second transistor is connected to the second electrode of the first transistor and the control terminal of the driving module.

17. The pixel driving circuit according to claim 16, wherein the power supply control module comprises:

a third transistor, wherein a first electrode of the third transistor is connected to the second scan signal terminal, a second electrode of the third transistor is connected to the input terminal of the driving module, and a third electrode of the third transistor is connected to the DC power supply signal terminal.

18. The pixel driving circuit according to claim 17, wherein the driving module comprises:

a fourth transistor, wherein a first electrode of the fourth transistor is connected to the second electrode of the second transistor and the output terminal of the compensation module, a second electrode of the fourth transistor is connected to the second terminal of the storage module and the light-emitting element, and a third electrode of the fourth transistor is connected to the second electrode of the first transistor and the second electrode of the third transistor.

19. The pixel driving circuit according to claim 18, wherein the compensation module comprises:

a fifth transistor, wherein a first electrode of the fifth transistor is connected to the second scan signal terminal, a second electrode of the fifth transistor is connected to the first terminal of the storage module, and a third electrode of the fifth transistor is connected to the first electrode of the fourth transistor.

20. The pixel driving circuit according to claim 19, wherein the charging module comprises:

a sixth transistor, wherein a first electrode of the sixth transistor is connected to the first scan signal terminal, a second electrode of the sixth transistor is connected to the first terminal of the storage module, and a third electrode of the sixth transistor is connected to the reference voltage terminal, and the storage module comprises:

a storage capacitor, wherein a first terminal of the storage capacitor is connected to the second electrode of the sixth transistor and the second electrode of the fifth transistor, and a second terminal of the storage capacitor is connected to the second electrode of the fourth transistor and the light-emitting element.

* * * * *